UNITED STATES PATENT OFFICE 2,344,707

PROCESS FOR PRODUCING 2-AMINO-PYRIMIDINE

Erwin Kuh, New Brunswick, N. J., assignor to American Cyanamid Company, New York, N. Y., a corporation of Maine No Drawing. Application September 19, 1942, Serial No. 458,999

8 Claims. (Cl. 260—251)

This invention relates to an improvement in the production of 2-aminopyrimidine from 2-amino-4-chloropyrimidine.

The production of 2-aminopyrimidine is of great technical importance because of the use of this compound in the production of the important pharmaceutical 2-sulfanilamidopyrimidine which is known generally as sulfadiazine. In commercial operations a more or less crude 2-amino-4-chloropyrimidine produced by the chlorination of isocytosine is reduced with zinc dust in order to replace the chlorine atom with a hydrogen atom. This process is described and claimed in the patents to Northey, 2,254,186, dated August 26, 1941, and Kuh and Hultquist, 2,242,079, dated May 13, 1941. The present invention is directed to an improvement on these processes. In the normal processes as described in the patents above, a large excess of zinc dust is used, the amount being normally of the order of magnitude of six times the theoretical quantity. If it is attempted to reduce the quantity of zinc the rate of reaction slows down rapidly and both yields and output suffer. After reduction it is customary to wash out the zinc hydroxide cake formed in order to remove 2-aminopyrimidine and it is possible by suitable removal of zinc compounds from the cakes to recover a portion of the unused zinc, but in practical operations on a commercial scale this procedure is expensive and requires considerable amounts of reagent as well as labor and equipment.

According to the present invention I have found an improved reduction or dechlorination can be obtained if the reaction is carried out in the presence of a surface active compound. The amount of zinc can be reduced down to about one third what was formerly necessary. Some of the zinc is entrapped with the activated charcoal in the filter cake and may be recovered and the activated charcoal liberated by treatment with dilute acid. The reaction is accelerated, the yields increase to a moderate degree, and the quality of the resulting 2-aminopyrimidine is improved.

While improved results are obtained with surface active agents generally, the different surface active agents vary among themselves in their effectiveness. It is possible to use such materials as diatomaceous earth, ordinary charcoal, silica gel and the like, but best results appear to be obtained when activated carbon is employed. Ordinary commercial grades of activated carbon such as those used for decolorizing give excellent results, and the use of activated carbon is the preferred embodiment of the present invention.

It is not intended to limit the present invention to any theory of action. It seems, however, reasonable that at least one factor may be the absorption of impurities present in the 2-amino-4-chloropyrimidine which may have a retarding effect on the reducing power of the zinc dust. Probably an even more important factor may be the absorption of zinc hydroxide which would maintain the surfaces of the zinc dust particles clean and hence promote the reaction. It is possible that other factors also play a part and the above explanation is advanced merely as a likely one.

While the present invention is not limited to the particular 2-amino-4-chloropyrimidine used as a raw material, the advantages are more marked in the case of relatively crude products obtained by the chlorination of isocytosine with phoshorous oxychloride. Pure 2-amino-4-chloropyrimidine is more readily reduced than the crude product, but even in this case improvements are obtained when the reaction is carried out in the presence of surface active agents such as activated carbon.

It is an advantage of the present invention that the amount of activated carbon required is not critical. In general amounts of the order of 10% of the weight of the zinc dust give good results and it is usually not commercially desirable to greatly exceed this proportion as the increased cost is not warranted by sufficiently improved results.

This invention has been described particularly in connection with the production of 2-aminopyrimidine from 2-amino-4-chloropyrimidine as this is the process used on large technical scale. The production of substituted 2-aminopyrimidine such as 2-amino-4-methylpyrimidine from similar substituted 2-amino-chloropyrimidines may also be carried out by means of the present invention.

The process will be described in the following specific examples in connection with the reduction of 2-amino-4-chloropyrimidine.

Example 1

11 parts of 2-amino-4-chloropyrimidine is stirred to a smooth slurry in a solution of 40 parts of water and 7 parts of sodium bicarbonate. This slurry is added gradually into a vigorously stirred mixture of 11 parts of zinc dust, 1.1 parts of activated carbon (for example the product commercially sold as Darco G60), 4 parts of 28% ammonium hydroxide, and 1 part of sodium bicarbonate. During the mixture the temperature is maintained at about 90° C. The time of feed will vary with the size of the charge from 15 minutes or less with a small charge, up to about an hour and a half on a full scale commercial charge. After all of the mixture has taken place, the temperature is maintained as well as agitation until the reaction is completed, which in a commercial batch will normally take slightly over an hour.

When dechlorination is complete, the reaction mixture is cooled to 55° C., then the excess zinc and the zinc hydroxide formed filtered off with the activated carbon. The 2-aminopyrimidine remains in the mother liquor and further amounts are obtained in wash liquors by washing the filter cake. The recovery of the aminopyrimidine from the liquors is effected in the conventional manner and yields of about 90% of the theoretical are obtained. The above time should be compared with the normal time, using 6 parts of zinc to 1 part of 2-amino-4-chloropyrimidine, which is about 6 hours.

*Example 2*

The procedure of Example 1 was followed, substituting for the 2-amino-4-chloropyrimidine, 2-amino-4-methyl-6-chloropyrimidine produced by the halogenation of 2-amino-4-methyl-6-hydroxypyrimidine with phosphorous oxychloride. The yield was approximately the same.

I claim:
1. A method of reducing a chloropyrimidine which comprises subjecting the chloropyrimidine to the action of metallic zinc in the presence of a water insoluble surface active material added to the reactants.
2. A method of reducing a chloropyrimidine which comprises subjecting the chloropyrimidine to the action of metallic zinc in the presence of an activated carbon added to the reactants.
3. A process of preparing 2-aminopyrimidine from 2-amino-4-chloropyrimidine which comprises reducing the latter with metallic zinc in the presence of a water insoluble surface active material added to the reactants.
4. A process of preparing 2-aminopyrimidine from 2-amino-4-chloropyrimidine which comprises reducing the latter with metallic zinc in the presence of an activated carbon added to the reactants.
5. A method according to claim 3 in which the amount of zinc is less than 6 times the theoretical amount.
6. A method according to claim 4 in which the amount of zinc is less than 6 times the theoretical amount.
7. A method according to claim 3 in which there are approximately 2 mols of zinc per mol of 2-amino-4-chloropyrimidine.
8. A method according to claim 4 in which there are approximately 2 mols of zinc per mol of 2-amino-4-chloropyrimidine.

ERWIN KUH.